May 8, 1962 S. D. A. DIEULANGARD 3,033,533
HEATING PARTITION STRUCTURES FOR BUILDINGS, AND IN
PARTICULAR IN HEATING FLOORS
Filed Nov. 29, 1957 4 Sheets-Sheet 1
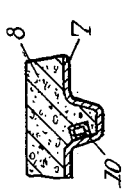
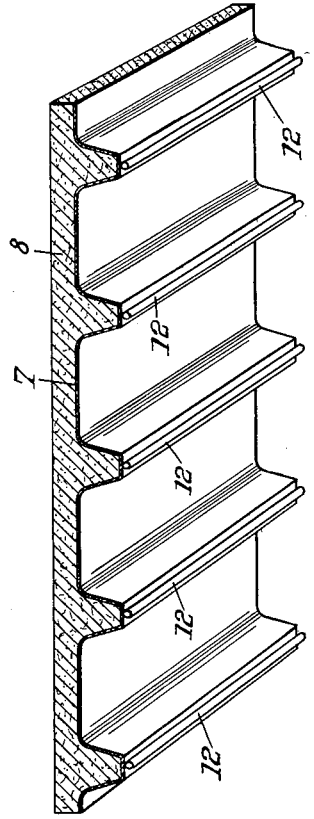
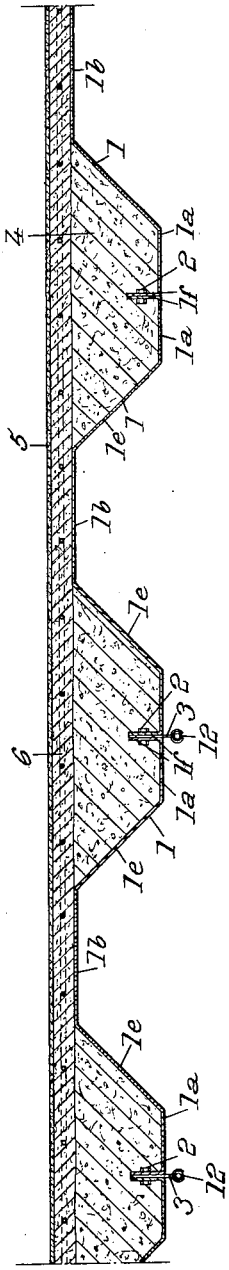
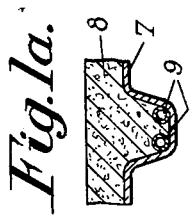
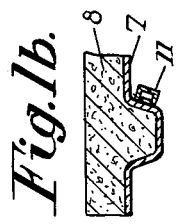
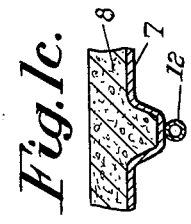

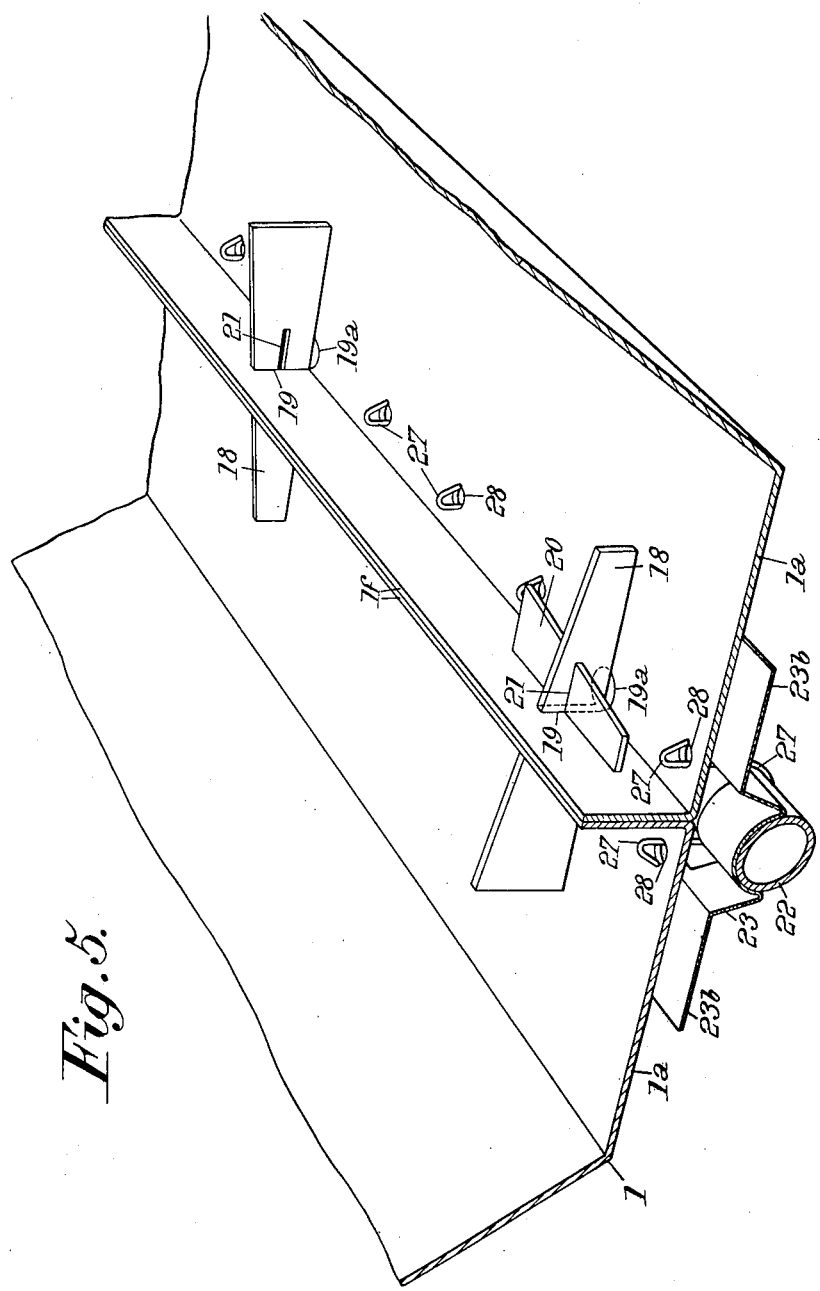

May 8, 1962 S. D. A. DIEULANGARD 3,033,533
HEATING PARTITION STRUCTURES FOR BUILDINGS, AND IN
PARTICULAR IN HEATING FLOORS
Filed Nov. 29, 1957 4 Sheets-Sheet 4

_United States Patent Office_

3,033,533
Patented May 8, 1962

3,033,533
HEATING PARTITION STRUCTURES FOR BUILDINGS, AND IN PARTICULAR IN HEATING FLOORS
Serge Désiré Auguste Dieulangard, 4 Ave. de la Cigale, Asnieres, France
Filed Nov. 29, 1957, Ser. No. 699,868
Claims priority, application France Nov. 30, 1956
5 Claims. (Cl. 257—124)

The present invention relates to heating partition structures especially adapted for industrial, commercial, administration and school buildings, but possibly also for residential buildings, the invention being especially important in its application to floors intended to heat the rooms located under them.

My invention is concerned with partition structures (floors, walls, roofs and so on) essentially constituted, on the side thereof turned toward the space to be heated, by juxtaposed metallic elements, hereinafter called "metal shapes," and on the other side by a masonry filling having a relatively low thermal conductivity. This is the case, in particular, of floors including a metallic framework covered by a concrete layer.

The object of my invention is to provide a structure of this kind which is better adapted to achieve a satisfactory heating of the room it limits.

For this purpose, according to my invention, such a structure includes heating elements in thermal contact with said metallic lining, the term "thermal contact" meaning either direct contact, or indirect contact through the interposition of a part or parts of high thermal conductivity.

Preferred embodiments of my invention will be hereinafter described with reference to the accompanying drawings, given merely by way of example and in which:

FIG. 1 is a perspective view of a floor seen frm underneath, said floor being provided with heating elements arranged according to my invention.

FIGS. 1a–1e are end sectional views of a floor provided with various heating elements.

FIG. 2 is a vertical sectional view of a floor made according to an embodiment of my invention.

FIG. 5 is a perspective view from underneath, with parts in cross-section, of a floor made according to another embodiment of the invention, the masonry filling being not shown.

Figure 3:
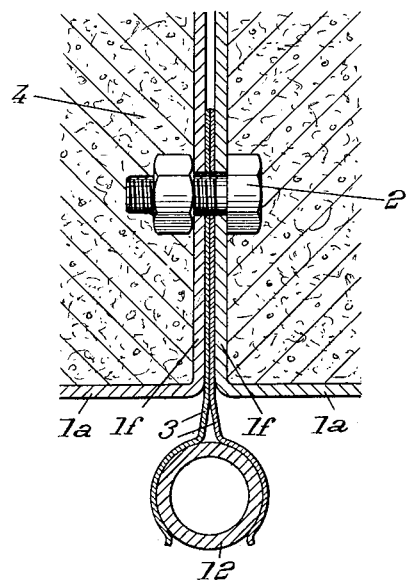
FIGS. 3 and 4 are detail views, on an enlarged scale, corresponding to FIG. 2 and FIG. 1d respectively.

It is recalled that heating floors have been made in which the heating elements are embedded in the concrete or other masonry filling of the floor. The drawbacks of such an arrangement are in particular a bad transmission of heat through the material of the filling in which the heating elements are embedded, and difficulties in detecting and repairing damages in the heating elements.

According to my invention, these drawbacks are eliminated, in a floor the under surface of which is constructed by a metal lining, by disposing the heating elements (in which a hot fluid circulates or which contain an electrical resistance) in thermal contact with said metal lining, that is to say either in direct contact with said lining, or with the interposition, between the heating elements and the lining, of connections having a high thermal conductivity and generally metallic.

In FIG. 1, the metal lining of the floor is shown at 7 and the masonry filling, of any type, is shown at 8. Heating elements are shown at 12.

As shown in FIGS. 1a–1e the heating elements may be disposed either on the upper face of the metal lining (as shown at 9 and 10), or preferably on the under face thereof (as shown at 11, 12 and 13). In the case of heating elements in which a hot fluid (water or steam) is circulated, the conduits for said fluid may be constituted by elements having a closed cross-section independent of the metal lining 7 (as shown at 9, 12 and 13), or one of the walls of which is constituted by said metal lining 7 (as shown at 10 and 11), liquid-tightness along the lines of joining being then obtained by welding.

It is advantageous to dispose the heating elements in the vicinity of the lowest points of the lining, when said lining is of corrugated shape (the corrugations being of any shape whatever). The height of the filling material 8 interposed between said heating elements and the space above the floor is thus maximum and the best possible heat insulation is obtained between said space and said heating elements.

My invention is especially intended for the floors of industrial, commercial, administrative and school buildings where the spans are relatively important (averaging from 8 to 12 m.). For such buildings it has already been known to make floors of reinforced concrete with metallic structures for pouring the concrete thereon, such metallic structures extending along the under face of the floors, but in this case the metallic structure does not cooperate in the resistance of the floor and acts merely as a mold for the concrete. In view of the relative weakeness of this metallic structure, it is necessary to support it at intermediate points by supporting means which are subsequently removed. This complicates the construction and increases the cost.

According to my invention, the metal shapes which constitute the metallic lining are calculated so as to be able to support the dead weight and a portion of the overload imposed on the floor, which permits construction without any intermediate support between the bearings. For spans ranging from 8 to 12 m., the metal sheets of the shapes have a thickness ranging from 2 to 4 mm., the total thickness of the floor in the thickest portions thereof corresponding to about $\frac{1}{30}$ of the span, the reinforced concrete plate 6 (FIG. 2) which extends across the tops of the corrugations having a thickness ranging from 4 to 5 cm., and the lower ridges of two consecutive corrugations being equal to about from 3 to 4 times the total thickness of the floor.

Until concrete has set, the only supporting element is constituted by the metallic lining, and consequently calculation is the same as in the case of metallic girders and presents no particular problem. After the concrete filling has set, the supporting system is constituted by the whole of the floor and in calculating the stresses due to overloads, heat insulating material 4 which is interposed in the hollows of the corrugations is not brought into play, the resistant system being constituted by the upper concrete plate in combination with the metal lining which is located under it. In FIG. 2, 5 designates a floor lining of conventional type.

The heat insulating material 4 which fills up the hollows of the corrugations may advantageously consist of a light pumice or puzzolana concrete, the top thereof being exactly at the level of the tops of the corrugations so that the reinforced concrete plate can be uniformly supported on the upper surface thus constituted.

The essential function of the heat insulating material is therefore to limit as much as possible the heat losses in the upward direction of the heating elements fixed to the lower part of the metal shapes. The distribution of the heat insulating material, with respect to the heating elements, is such that the superficial temperature of the top surface of the floor undergoes a uniform elevation of only from 2 to 3° C. with respect to the ambient temperature of the room supposed to be heated at the same temperature as the room located under the floor.

An important consequence of this particular distribution of the materials in the floor consists in the fact that this floor has excellent qualities of acoustic absorption between two floors.

Furthermore, due to the fact that the under face of the floor is constituted by corrugations which have horizontal and oblique faces alternately, the room located under the floor has a very low sonority due to the multiple reflections of the sound waves.

These two particular acoustic properties make my construction particularly useful in the case of commercial rooms, school-rooms, etc.

The presence of the heat insulating material above most of the metallic linings has a further advantage in that it reduces the thermal inertia of the heating system.

As a matter of fact, a rise of temperature of the heating element causes, due to the high thermic conductivity of the metallic lining, a quick rise of temperature of the metal elements of said lining, and a simultaneous increase of the heat radiation of the ceiling. Now this radiation of the ceiling corresponds to about ⅘ of the total emission of said ceiling. Total thermal equilibrium in the whole thickness of the floor is, on the contrary, obtained after a much longer time due to the delay caused by the thermal transmission in the upward direction through the heat insulating material.

On the contrary, in floors where the concrete plate is supported on the metal shapes forming the lining without interposition of heat insulating material, the rise of temperature of the metallic lining is slowed down by the heat losses through said concrete plate, which enormously increases the thermal inertia of the heat emitting system.

Advantageously, the metal shapes forming the metallic lining are corrugated, the corrugations being of any suitable shape, the cross-section thereof being possibly polygonal, curvilinear or even constituted by a succession of curves and polygonal lines. As shown by FIG. 2 (where the metal shapes are designated by reference numeral 1), the top and bottom portions of the metallic lining are rectilinear and horizontal (1a and 1b) and are connected together by oblique portions (1e). In cross-section, these corrugations therefore form trapeziums projecting in the downward direction and the upper bases of these trapeziums are longer than their lower bases. This arrangement is preferred but the reverse arrangement might possibly be used.

Some interval might be left between contiguous metal shapes but it is preferable to have them in adjoining relation as shown by the drawings, the joint being preferably located at the lower parts (for instance at 1a) of the corrugation.

It should be noted that the metal shapes, although they correspond each to only one corrugation on the drawings (a top portion between two bottom portions), might correspond each to several corrugations.

When the consecutive metal shapes have their edges in adjoining contact, connection between them may be ensured merely at the points where said metal shapes are fixed to the walls or frame of the building. However I consider that it is preferable to provide supplementary joint means along the contacting edges. These means may consist in weld lines or bolts 2 (FIGS. 2 and 3) or rivets extending through vertical flanges 1f of the metal shapes, or again in keys (such as shown in FIG. 5).

In FIG. 5, the connection between the vertical flanges 1f of the two adjoining shapes 1 tightly applies the metal shapes against one another and fixes the corresponding portions 1a exactly in line with each other. Connection devices are provided at regular intervals along the edges of the metal shapes. Each of these devices includes a double key system. The first key 18 is engaged in two vertical slots 19 provided in the respective flanges 1f. It is wedged by hammering. The second key 20 is inserted in a slot 21 of key 18 and by hammering it causes the two flanges 1f to be tightly applied against each other.

These connecting devices are disposed at a distance from one another substantially equal to the distance between two consecutive corrugations of the floor, the key 18 of each device being inserted from the right and from the left alternately.

Slots 19 provided in the metal shapes extend also in the under surfaces 1a of the metal shapes so as to form small holes 19a. These holes serve for the elimination of water which may have remained in the corrugations of the metallic lining.

When the metal shapes are assembled together to form the metallic lining, it may be useful to take advantage of the means which serve to apply flanges 1f against one another, for instance fixation bolts 2 or the like, to provide, at suitable places along at least some of the joints, fixation clips, such as visible at 3 in FIGS. 2 and 3, intended to support the heating elements.

Advantageously, each of these clips is constituted by the two metal plates, for instance aluminum plates, the free ends of which are in the form of jaws, said plates extending along the joints between the metal shapes or being merely located at points along said joints, that is to say at the places where bolts are provided. Such clips may be tightly held between the flanges 1f of the metal shapes and they hold between them the heating elements 12 by elasticity, so that good heat interchange conditions are obtained between elements 12 and metal shapes 1 by conduction and also by convection.

Figure 4:
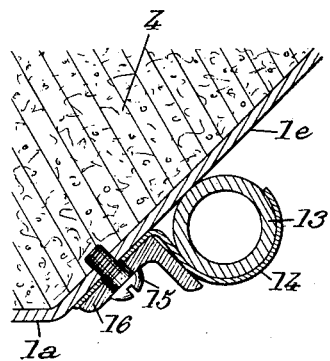
Figure 7:
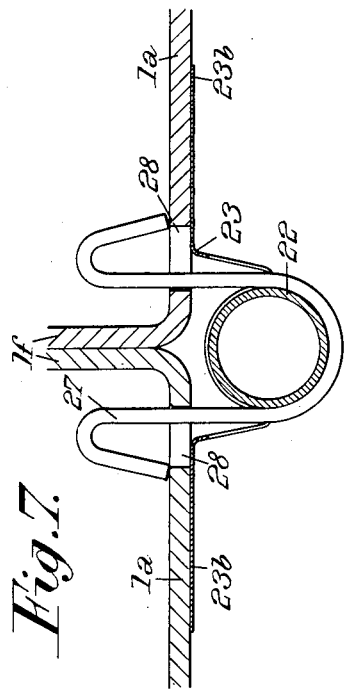
FIG. 7 is a vertical section on an enlarged scale of a detail of FIG. 5.
Figure 8:
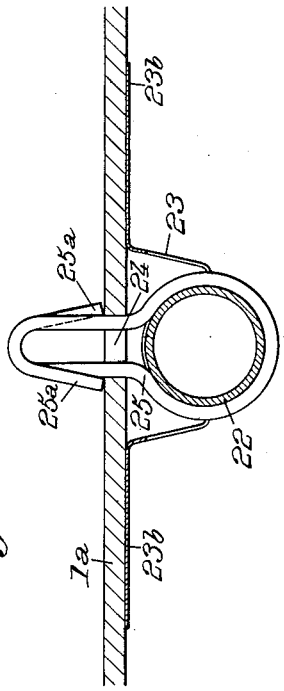
FIGS. 8 and 9 show modifications of FIG. 7, respectively.
Figure 6:
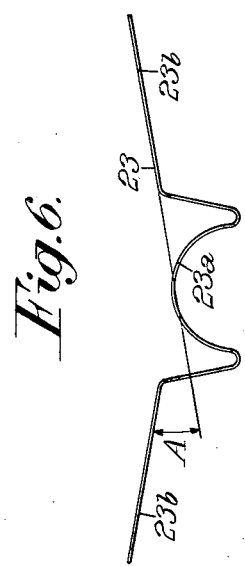
FIG. 6 shows the metal element connecting a tube to the metal shapes of FIG. 5, said element being shown in the state of rest.
Figure 9:
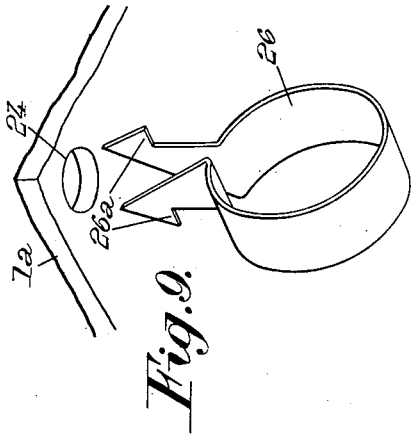

If such clips 3 are not provided in advance, I may fix such clips on the metal shapes in any suitable manner. For instance, in the case of FIG. 4, it has been supposed that the heating elements 13 are secured to the oblique portion 1e of a metal shape by means of a clip 14 secured by a screw 15 between the portion 1 of the metal shape and an angle iron 16. Clip 14 is obtained by folding an aluminium sheet.

FIGS. 5 to 9 show other devices for securing the heating means to the metal shapes, these fixation means being particularly advantageous.

Preferably, the heating elements are constituted by copper tubes such as shown at 22, because, for the same amount of heating fluid circulating through the tube, the diameter of such a tube will be smaller than that of an iron tube. This is due to the fact that the internal walls of industrial copper tubes are much smoother than the inner walls of iron tubes, so that there is a great reduction of the pressure drops due to friction. On the other hand, the standard thicknesses of copper tubes are smaller than those of corresponding iron tubes. Practically, the use of cooper tubes permits of choosing internal and external diameters of 10 x 12 mm. instead of 15 x 21 mm. for an iron tube.

The heat conducting elements interposed between these copper tubes and the metal shapes are constituted by thin strips 23 of copper (for instance 0.3 mm. thick) comprising a central rounded portion 23a of semi-cylindrical shape corresponding to the external diameter of the copper tube and two longitudinal wings 23b intended to be applied against the metal shapes. In the state of rest (FIG. 6), these wings are not located in the same plane and make with each other an acute angle A of about 20°.

When the heating elements are fixed in position, the conductor elements 23 are caught between the flat surface of the metallic lining 1a and the corresponding copper tube 22, which engages the rounded central portion 23a of elements 23. Due to the resiliency of such elements 23, the copper tube is tightly applied against the whole surface of the portion 23a of elements 23, whereas the wings 23b of said elements are also tightly applied over their whole area against the under face 1a of the metal shapes. Thus the necessary intimate contacts are insured to obtain a good thermal conductivity.

The copper tubes are fixed to the metal shapes in the following manner. When such a copper tube is to be fixed on an oblique portion of a metal shape, the fixation clips are preferably in the form shown by FIG. 8 or FIG. 9. These clips include a circular portion intended to pass around the copper tube 22 and two branches for fixation on the metal shape. These branches are close to each other and provided with projections 25a or 26a adapted to be applied against the inner wall of the metal shapes. A single hole 24 is provided for the passage of the branches. Each of said clips is constituted by a tempered steel wire (clip 25, FIG. 8) or by a thin strip of tempered steel (clip 26, FIG. 9).

When the heating element is to be located opposite the joint between two metal shapes, it is no longer possible to provide a single fixation hole since this hole would then extend in the plane of contact of flanges 1f. A different type of clip 27 (FIGS. 5 and 7) is then used, said clip including two branches which engage in two respective holes 28 provided in the two metal shapes on either side of the plane of contact of flanges 1f. When these holes 28 are made in advance, the two holes corresponding to give clips are automatically placed opposite each other owing to the provision of the above described key devices for assembling the metal shapes. Clips 27 may also be made either of tempered steel wire, or of a thin strip of tempered steel.

What ever be the fixation of the heating elements, the fixation holes above referred to are hidden by the heating elements themselves and only the clips are visible on the copper tube.

When the temperature of the heating elements changes, no noise is produced because the heating elements and the clips by which they are supported are made of the same metal and have the same coefficient of thermal expansion. Furthermore, the surfaces in contact are smoother than in the case of iron tubes held by aluminium clips.

Fixation of the heating elements is effected very quickly since it suffices to push metal clips into holes provided in advance.

Whereas the above description has been made with reference to a floor, it must be well understood that it would also apply to another type of building partition.

Such partitions may consist for instance:

of prefabricated panels or walls having external metallic faces, with or without insertion of heat insulating materials, or of light covering metal panels provided on the external side with one or several heat insulating materials and a water-tight lining.

In all cases, according to my invention, the heating elements are applied on the internal metallic lining so as to diffuse the heat into said lining by thermal conductivity, with a final emission of said heat toward the inside of the place by radiation and convection.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A building structure comprising a supporting structure, a plurality of metal shapes fixed at their ends to said supporting structure and juxtaposed to form a metallic lining including downwardly extending corrugations, a slab of reinforced concrete secured to the top of said metallic lining and constituting a floor, each corrugation defining a space with said slab and forming with said slab a closed form girder fixed to said supporting structure, a heat insulating material filling the spaces between said slab and said lining, a plurality of heat conveying and transmitting elements supported from said metallic lining and extending therebeneath, and means for thermally connecting said elements to said metallic lining.

2. A building structure comprising a supporting structure, a plurality of metal shapes fixed at their ends to said supporting structure and juxtaposed to form a metallic lining including downwardly extending corrugations, a slab of reinforced concrete secured to the top of said metallic lining and constituting a floor, each corrugation defining a space with said slab and forming with said slab a closed form girder fixed to said supporting structure, a heat insulating material filling the spaces between said slab and said corrugations, a plurality of pipes for the circulation of a heating fluid mounted beneath said lining, and means for fixing said pipes to said lining and thermally connecting said pipes with said lining.

3. A building structure comprising a supporting structure, a plurality of metal shapes fixed at their ends to said supporting structure and juxtaposed to form a metallic lining including downwardly extending corrugations, a slab of reinforced concrete secured to the top of said metallic lining and constituting a floor, each corrugation defining a space with said slab and forming with said slab a closed form girder fixed to said supporting strucutre, a heat insulating material filling the spaces between said slab and said corrugations, a plurality of pipes for the circulation of a heating fluid mounted on said lining and extending therebeneath, a plurality of metal strips of a metal which is a good conductor of heat, each of said strips including a rounded central portion shaped to fit on the upper part of one of said tubes respectively and two wing portions applied against the under surface of said lining, said strips extending along said tubes respectively, and clips located at spaced points along said tubes, each of said clips passing around the under part of one of said tubes and engaging said lining so as both to secure said tube to said lining and to apply said wing portions of the corresponding strip against said lining.

4. A building structure according to claim 3 in which each of said clips includes two upwardly extending hooks, said lining being provided with two distinct holes for said hooks to enable the same to engage therethrough and to bear against the upper face of said lining.

5. A building structure according to claim 3 in which each of said clips includes two upwardly extending hooks bent in opposed directions respectively, said lining being provided with a single hole for both of said hooks to enable the same to engage therethrough and to bear against the upper face of said lining on opposed sides of said hole respectively.

References Cited in the file of this patent

UNITED STATES PATENTS

| | | |
|---|---|---|
| 1,068,544 | Stewart | July 29, 1913 |
| 1,178,210 | Brinckenhoff | Apr. 4, 1916 |
| 2,014,971 | Knutson | Sept. 17, 1935 |
| 2,221,001 | Lucius | Nov. 12, 1940 |
| 2,281,299 | Steenstrup | Apr. 28, 1942 |
| 2,681,196 | Lind | June 15, 1954 |
| 2,705,886 | Annett | Apr. 12, 1955 |
| 2,721,731 | Rapp | Oct. 25, 1955 |

FOREIGN PATENTS

| | | |
|---|---|---|
| 233,087 | Great Britain | May 7, 1925 |
| 264,004 | Great Britain | Jan. 13, 1927 |
| 286,033 | Switzerland | Oct. 15, 1952 |

(Other references on following page)

FOREIGN PATENTS

| | | | |
|---|---|---|---|
| 305,373 | Switzerland | May 2, | 1955 |
| 335,634 | Great Britain | Oct. 2, | 1930 |
| 399,681 | Great Britain | Oct. 12, | 1933 |
| 485,462 | Great Britain | May 19, | 1938 |
| 678,966 | Great Britain | Sept. 10, | 1952 |
| 747,670 | Great Britain | Apr. 11, | 1956 |
| 1,046,905 | France | July 15, | 1953 |
| 1,161,895 | France | Mar. 31, | 1958 |